US012784330B2

(12) United States Patent
Lin et al.

(10) Patent No.: US 12,784,330 B2
(45) Date of Patent: Nov. 3, 2026

(54) GENERATING THREE-DIMENSIONAL IMAGES USING TRANSFORMER-BASED AND DIFFUSION-BASED ARTIFICIAL INTELLIGENCE TECHNIQUES

(71) Applicant: Dell Products L.P., Round Rock, TX (US)

(72) Inventors: Lyne Zhenzhen Lin, Shanghai (CN); Tianlu Fei, Shanghai (CN); Junyi Wu, Zhejiang (CN); Bin He, Shanghai (CN); Zijia Wang, London (GB)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 18/893,283

(22) Filed: Sep. 23, 2024

(65) Prior Publication Data

US 2026/0087730 A1 Mar. 26, 2026

(51) Int. Cl.
*G06T 15/20* (2011.01)
*G06T 5/60* (2024.01)
(Continued)

(52) U.S. Cl.
CPC .................................. *G06T 15/205* (2013.01)

(58) Field of Classification Search
CPC ....... G06T 15/205; G06T 15/04; G06T 15/20; G06T 19/20; G06T 2219/2016; G06T 2219/2021; G06T 2207/10016; G06T 2207/20081; G06T 5/60; G06T 5/70; G06T 7/11; G06T 7/13; G06T 7/55; G06T 7/246; G06T 13/40; G06T 13/80; G06T 17/00;
(Continued)

(56) References Cited

U.S. PATENT DOCUMENTS 12,051,147 B1 * 7/2024 Erze ........................ G06V 20/64
12,456,250 B1 * 10/2025 Wang .................... G06T 15/205
(Continued)

OTHER PUBLICATIONS

Zi-Xin Zou, Triplane Meets Gaussian Splatting: Fast and Generalizable Single-View 3D Reconstruction with Transformers, Dec. 16, 2023, IEEE CVPR, pp. 12588-12597 (Year: 2023).*
(Continued)

*Primary Examiner* — Wesner Sajous
(74) *Attorney, Agent, or Firm* — Ryan, Mason & Lewis, LLP

(57) ABSTRACT

Methods, apparatus, and processor-readable storage media for generating 3D images using transformer-based and diffusion-based artificial intelligence techniques are provided herein. An example computer-implemented method includes obtaining at least one 2D image; generating one or more point cloud tokens and one or more triplane tokens based at least in part on at least portions of the at least one 2D image; determining multiple 3D features associated with the at least portions of the at least one 2D image by processing at least a portion of the one or more point cloud tokens and at least a portion of the one or more triplane tokens using one or more transformer-based artificial intelligence techniques; and generating a 3D image associated with the at least portions of the at least one 2D image by processing at least a portion of the multiple 3D features using one or more diffusion-based artificial intelligence techniques.

20 Claims, 7 Drawing Sheets

(51) Int. Cl.
*G06T 13/40* (2011.01)
*G06T 19/20* (2011.01)
*G06V 20/64* (2022.01)

(58) Field of Classification Search
CPC ..... G06T 17/10; G06T 17/20; G06T 2210/56; G06T 2207/20084; G06T 2207/10024; G06T 2200/24; G06T 11/00; G06T 11/40; G06V 20/64; G06V 2201/09; G06N 3/0495; G06N 3/045; G06N 3/0464; G06N 3/088; G06N 3/0455; G06N 3/0475
See application file for complete search history.

(56) References Cited

U.S. PATENT DOCUMENTS

2023/0360294 A1* 11/2023 Aggarwal ................. G06T 7/13
2024/0153196 A1* 5/2024 Blukis ....................... G06T 7/90
2025/0308082 A1* 10/2025 Nie ......................... G06T 11/00
2025/0336154 A1* 10/2025 Zhang ...................... G06T 17/20
2025/0356506 A1* 11/2025 Kansy ..................... G06T 7/246

OTHER PUBLICATIONS

E. R. Chan et al., "Efficient Geometry-aware 3D Generative Adversarial Networks," arXiv:2112.07945v2, Apr. 27, 2022, 27 pages.
Z.-X. Zou et al., "Triplane Meets Gaussian Splatting: Fast and Generalizable Single-View 3D Reconstruction with Transformers," arXiv:2312.09147v2, Dec. 16, 2023, 12 pages.
B. Kerbl et al., "3D Gaussian Splatting for Real-Time Radiance Field Rendering," arXiv:2308.04079v1, Aug. 8, 2023, 14 pages.
A. Haque et al., "Instruct-NeRF2NeRF: Editing 3D Scenes with Instructions," arXiv:2303.12789v2, Jun. 1, 2023, 13 pages.
Y. Chen et al., "GaussianEditor: Swift and Controllable 3D Editing with Gaussian Splatting," arXiv:2311.14521v4, Dec. 20, 2023, 14 pages.
A. Takyar et al., "Exploring Diffusion Models: A Comprehensive Guide to Key Concepts and Applications," https://www.leewayhertz.com/diffusion-models/, Accessed Jun. 19, 2024, 33 pages.

* cited by examiner

GENERATING THREE-DIMENSIONAL IMAGES USING TRANSFORMER-BASED AND DIFFUSION-BASED ARTIFICIAL INTELLIGENCE TECHNIQUES

BACKGROUND

Various models are often used in two-dimensional (2D) generative artificial intelligence techniques. However, conventional artificial intelligence approaches often fail to successfully use models in three-dimensional (3D) generative artificial intelligence techniques. Such conventional approaches typically involve time-consuming processes, consume a significant amount of resources (e.g., graphics processing unit (GPU) memory resources), and restrict adoption across heterogeneous hardware.

SUMMARY

Illustrative embodiments of the disclosure provide techniques for generating 3D images using transformer-based and diffusion-based artificial intelligence techniques.

An exemplary computer-implemented method includes obtaining at least one 2D image, and generating one or more point cloud tokens and one or more triplane tokens based at least in part on at least portions of the at least one 2D image. The method also includes determining multiple 3D features associated with the at least portions of the at least one 2D image by processing at least a portion of the one or more point cloud tokens and at least a portion of the one or more triplane tokens using one or more transformer-based artificial intelligence techniques. Additionally, the method includes generating a 3D image associated with the at least portions of the at least one 2D image by processing at least a portion of the multiple 3D features using one or more diffusion-based artificial intelligence techniques.

Illustrative embodiments can provide significant advantages relative to conventional artificial intelligence approaches. For example, problems associated with time-consuming and resource-intensive processes are overcome in one or more embodiments through generating 3D images by processing point cloud tokens and triplane tokens using transformer-based and diffusion-based artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
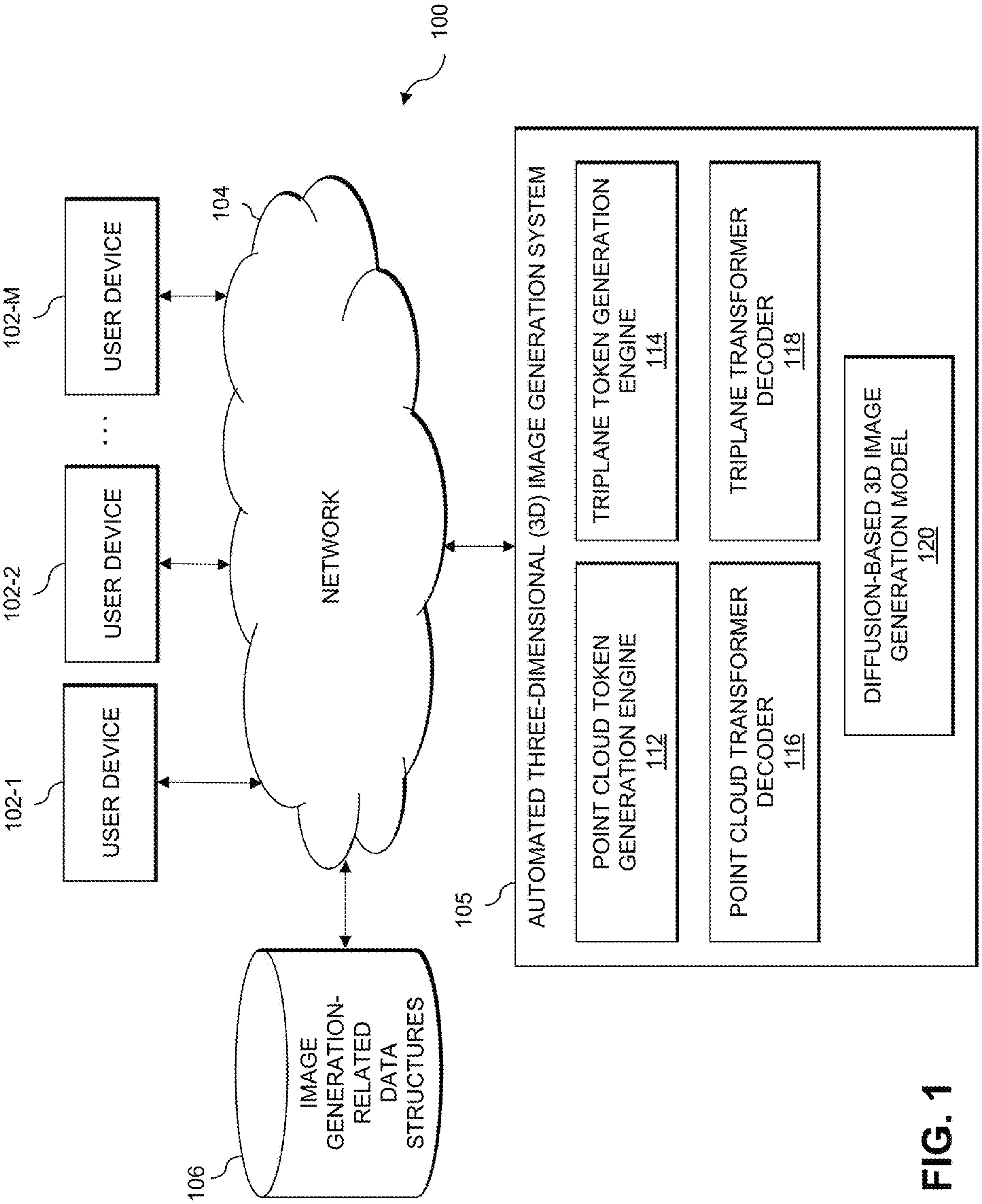
FIG. 1 shows an information processing system configured for automatically generating 3D images using transformer-based and diffusion-based artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated 3D image generation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the automated 3D image generation system 105 can have one or more associated image generation-related data structures 106 configured to store data pertaining to 3D image generation such as, e.g., image iterations, 2D diffusion images, viewpoint data, semantic tracing masks and/or related information, etc. The term "data structure," as used herein, is intended to be broadly construed, so as to encompass, for example, a wide variety of different types of tables, arrays, graphs, trees, linked lists, and additional or alternative data relation mechanisms, as well as portions or combinations thereof. Accordingly, a given data structure can comprise a combination of multiple smaller data structures, possibly of different types, or a portion of a larger data structure. Numerous other arrangements are possible.

The image generation-related data structures 106 in the present embodiment are implemented using one or more storage systems associated with the automated 3D image generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the automated 3D image generation system 105 are one or more input-output devices, which illustratively comprise keyboards, displays or other types of input-output devices in any combination. Such input-output devices can be used, for example, to support one or more user interfaces to the automated 3D image generation system 105, as well as to support communication between the automated 3D image generation system 105 and other related systems and devices not explicitly shown.

Additionally, the automated 3D image generation system 105 in the FIG. 1 embodiment is assumed to be implemented using at least one processing device. Each such processing device generally comprises at least one processor and an associated memory, and implements one or more functional modules for controlling certain features of the automated 3D image generation system 105.

More particularly, the automated 3D image generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the automated 3D image generation system 105 to communicate over the network

104 with the user devices 102, and illustratively comprises one or more conventional transceivers.

The automated 3D image generation system 105 further comprises a point cloud token generation engine 112, a triplane token generation engine 114, a point cloud transformer decoder 116, a triplane transformer decoder 118, and a diffusion-based 3D image generation model 120.

It is to be appreciated that this particular arrangement of elements 112, 114, 116, 118 and 120 illustrated in the automated 3D image generation system 105 of the FIG. 1 embodiment is presented by way of example only, and alternative arrangements can be used in other embodiments. For example, the functionality associated with elements 112, 114, 116, 118 and 120 in other embodiments can be combined into a single module, or separated across a larger number of modules. As another example, multiple distinct processors can be used to implement different ones of elements 112, 114, 116, 118 and 120 or portions thereof.

At least portions of elements 112, 114, 116, 118 and 120 may be implemented at least in part in the form of software that is stored in memory and executed by a processor.

It is to be understood that the particular set of elements shown in FIG. 1 for automatically generating 3D images using transformer-based and diffusion-based artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of automated 3D image generation system 105, image generation-related data structures 106, and user devices 102 can be on and/or part of the same processing platform.

An exemplary process utilizing elements 112, 114, 116, 118 and 120 of an example automated 3D image generation system 105 in computer network 100 will be described in more detail with reference to the flow diagram of FIG. 5.

Accordingly, at least one embodiment includes generating and/or implementing at least one transformer-based mechanism for 3D diffusion. As detailed herein, diffusion models are used in generative artificial intelligence techniques as a type of probabilistic generative model that transforms noise into a representative data sample. Such diffusion models aim to capture the underlying distribution of a given dataset, and learn to generate new samples that resemble the training data by iteratively refining the models' output.

As further detailed herein, one or more embodiments include generating and/or implementing at least one transformer-based 3D diffusion architecture in connection with Gaussian splatting with triplane representations. More particularly, and as additionally described herein, at least one embodiment includes implementing a memory-efficient 3D diffusion solution which uses triplane to record one or more Gaussian features, and uses one or more transformers for efficient 3D reconstructions. Such an embodiment can include reducing the time consumption and memory usage as compared to conventional approaches, while providing high quality in the reconstructed 3D models.

One or more embodiments include splitting or dividing one or more Gaussians into one or more point cloud tokens and one or more triplane tokens. The term "point cloud token," as used herein, is intended to be broadly construed, so as to encompass, for example, a wide variety of representations of one of more sets of one or more data points in a 3D coordinate system (e.g., wherein each data point represents a spatial measurement on the surface of a given object). Additionally, the term "triplane token," as used herein, is intended to be broadly construed, so as to encompass, for example, a wide variety of representations of one or more data points (e.g., data features) on one or more axis-aligned planes.

Figure 2:
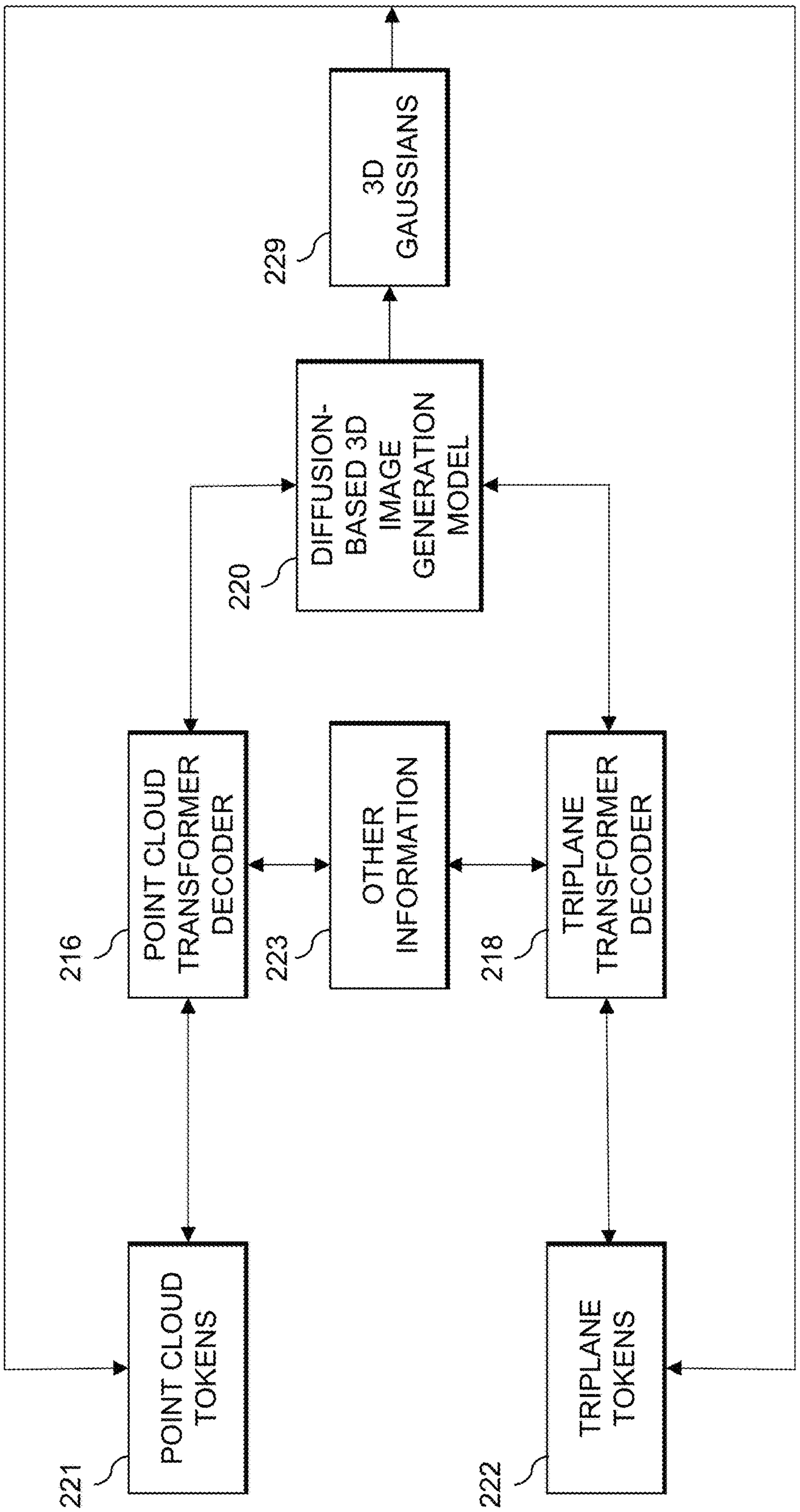
FIG. 2 shows example architecture for representing 3D Gaussians in an illustrative embodiment.

FIG. 2 shows example architecture for representing 3D Gaussians in an illustrative embodiment. By way of illustration, FIG. 2 depicts point cloud tokens 221, which are decoded, in connection with other information 223, by point cloud transformer decoder 216. Additionally, FIG. 2 depicts triplane tokens 222, which are decoded, in connection with other information 223, by triplane transformer decoder 218. At least a portion of the decoded outputs of point cloud transformer decoder 216 and triplane transformer decoder 218 are then provided to diffusion-based 3D image generation model 220 (e.g., a Gaussian decoder), which processes such outputs and generates one or more 3D Gaussians 229.

In accordance with the example embodiment depicted in FIG. 2, one or more explicit features (e.g., of an 2D image) can be aligned along a three axis-aligned orthogonal feature, and can be aggregated to one or more 3D features as color and density for one or more 3D positions. Further, a triplane and point cloud are embedded into one or more triplane tokens 222 and one or more point cloud tokens 221, respectively, and are input to transformers for cross-attention and decoding processes.

In one or more embodiments, a diffusion process can be iterative from 2D diffusion images, the generated 3D Gaussians 229 in every iteration need to be back propagated to tokens (e.g., one or more triplane tokens 222 and one or more point cloud tokens 221) that will be used for the next iteration. Along with other information 223, as further detailed herein, such an example architecture as depicted in FIG. 2 can generate diffused 3D Gaussians 229. Also, in at least one embodiment, the diffusion-based 3D image generation model 220 can include a pre-trained multilayer perceptron (MLP) used to combine point cloud and triplane presentations to generate the one or more 3D Gaussians 229.

Figure 3:
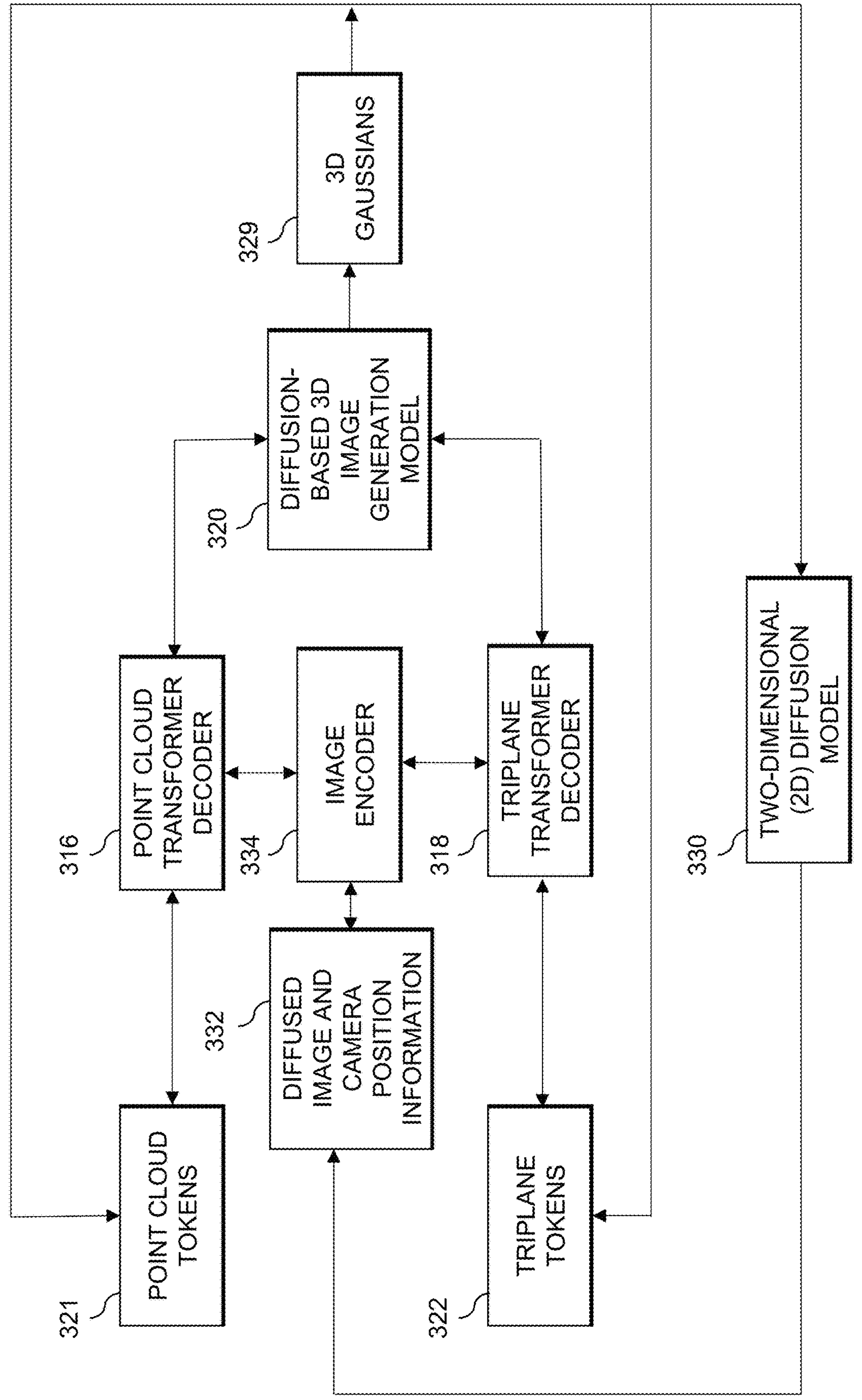
FIG. 3 shows example architecture for diffusion in 3D reconstruction in an illustrative embodiment.

FIG. 3 shows example architecture for diffusion in 3D reconstruction in an illustrative embodiment. By way of illustration, FIG. 3 depicts a similar architecture to that depicted in FIG. 2, with multiple modifications and/or additions. In a 3D diffusion process such as depicted in the example embodiment of FIG. 3, the diffused result will be added into the architecture for the final 3D result. More particularly, rendered from 3D Gaussians 329 (as generated by diffusion-based 3D image generation model 320), the image is then diffused by at least one 2D diffusion model 330 (e.g., Stable Diffusion, DALL·E, etc.), and the diffused image and camera position information 332 are sent to and/or processed by image encoder 334 to generate one or more one or more feature tokens from the diffused image. In one or more embodiments, image encoder 334 can include a combination of at least one pre-trained vision transformer-based (ViT-based) model and at least one adaptive layer to modulate one or more image features and one or more camera position and/or viewpoint features.

Accordingly, such an embodiment as depicted in FIG. 3 results in one or more image features which are aware of the observation viewpoint(s), and the output(s) of image encoder 334 are used to guide both point cloud transformer decoder 316 and triplane transformer decoder 318, along with the respective transformers thereof, in connection with processing point cloud tokens 321 and triplane tokens 322, respectively.

As every diffused image has viewpoint information (as captured, e.g., via element 332 in FIG. 3), such a modification carried out in connection with image encoder 334 impacts the same angle(s) of the 3D model and its projection to one or more other angles during the diffusion reconstruction. As a result, such an embodiment may only require performing several iterations of diffusion to reach a 360-degree modification of a 3D model, significantly reducing the generation time of 3D diffusion models.

Figure 4:
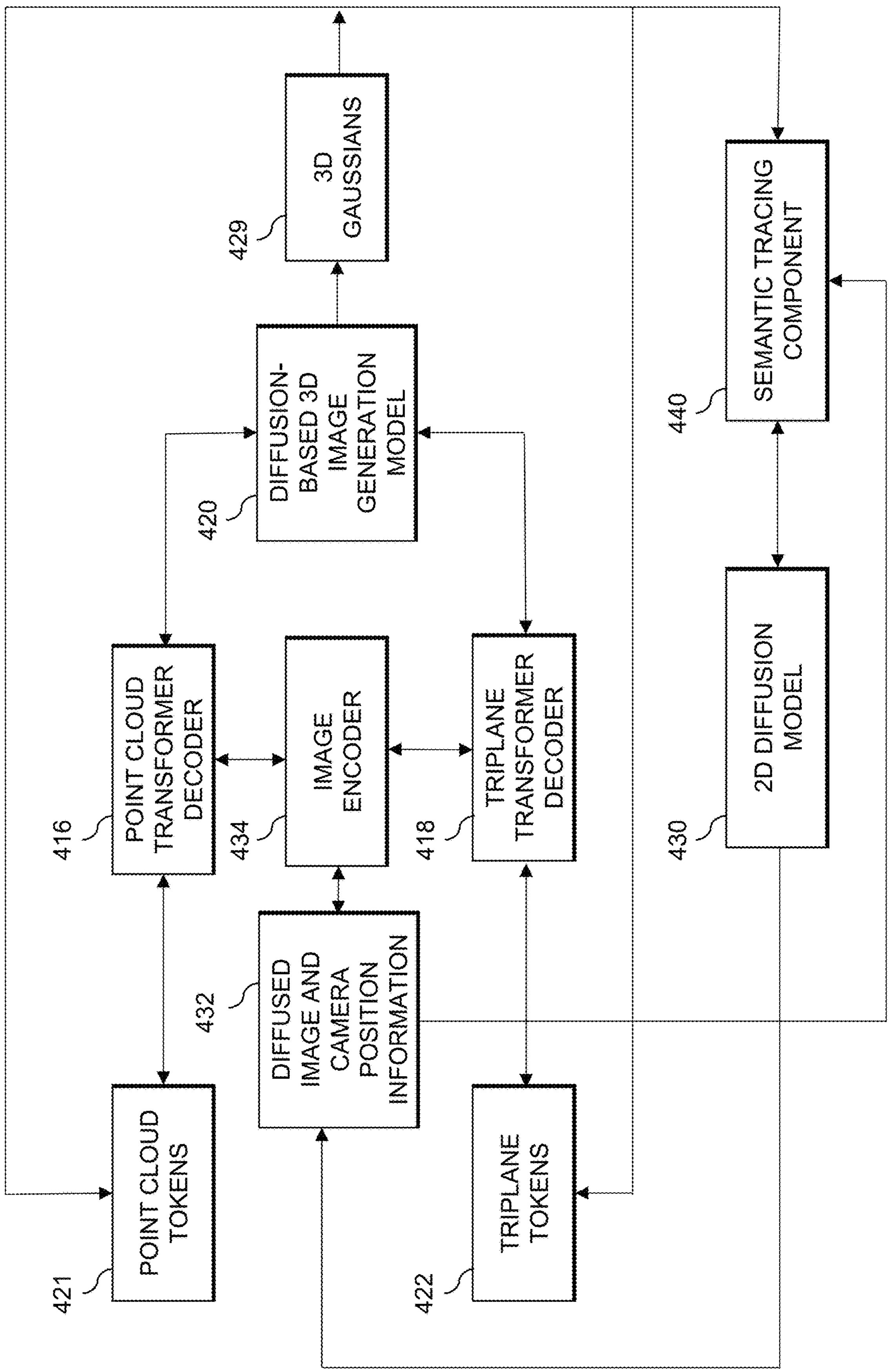
FIG. 4 shows example architecture for diffusion in 3D reconstruction with semantic tracing in an illustrative embodiment.

FIG. 4 shows example architecture for diffusion in 3D reconstruction with semantic tracing in an illustrative embodiment. By way of illustration, FIG. 4 depicts an example embodiment which includes the same architecture depicted in FIG. 3 while also incorporating semantic tracing for enhanced processing. In such an embodiment, a 2D diffusion model (e.g., 2D diffusion model 430) may not be able to guarantee consistency among image generations, even if the images are of the same object from different angles. Accordingly, such an embodiment can include employing semantic tracing component 440 into the architecture to restrict the modification area of 3D Gaussians 429, and efficiently reach a convergence in the final model.

As used herein, semantic tracing refers to techniques which dynamically define the diffusion area for a more precise 3D diffusion. In one or more embodiments, semantic tracing can be implemented (e.g., via semantic tracing component 440) by adding at least one mask in every 3D Gaussian 429 to signify at least one given area for every iteration, speeding up the rendering and diffusion processes in one or more scenes (e.g., complex scenes) and reducing divergence in each iteration.

More particularly, from a single image, one or more embodiments can include obtaining and/or implementing a semantic label (also referred to as a mask) by processing the 2D semantic label back to 3D Gaussians 429 with inverse rendering. As a result, as depicted in the example embodiment of FIG. 4, every diffused image (e.g., diffused image and camera position information 432) can be processed by semantic tracing component 440 to provide a refreshed mask parameter for every 3D Gaussian 429. Using the mask, the rendered image and the 2D diffusion (performed by 2D diffusion model 430) can be constrained to the masked area, further reducing time consumption and/or other resource consumption. Correspondingly, in such an embodiment, as the 3D Gaussians 429 include an added attribution mask, the triplane generation (e.g., with respect to triplane tokens 422) can add the attribution mask as an input, and the triplane transformer decoder 418 can be formed using Equation (1), as follows:

$$(c, \alpha, m, s, q, sh) = \varphi(x, f) \tag{1}$$

In Equation (1), x refers to a given position, and f refers to the triplane feature at that position. Using $\varphi$, an MLP can decode the attribute(s), and the Gaussian parameters can be extracted, including color (c), opacity ($\alpha$), mask (m), anisotropic covariance (represented by a scale(s) and a rotation (q)), and spherical harmonics coefficients (sh). Together with outputs from point cloud transformer decoder 416 (generated in connection with point cloud tokens 421 and image encoder 434), the 3D Gaussians 429 can be generated by diffusion-based 3D image generation model 420 as the final 3D model.

Using an architecture such as depicted in the example embodiment of FIG. 4, a 3D diffusion process can be performed more quickly and using fewer hardware resources than in conventional approaches. Accordingly, one or more embodiments include generating and/or implementing a transformer-based 3D diffusion architecture in connection with Gaussian splatting and triplane representation.

As detailed herein, such an embodiment includes adopting and/or implementing triplane representation to abstract one or more Gaussian features, which reduces the memory occupation in one or more GPUs during image reconstruction. Additionally, at least one embodiment includes integrating Gaussian semantic tracing into triplane representation, which enhances accuracy for the diffusion process. Further, implementing a transformer-based architecture, as noted above and described herein, reduces the required number of diffusion iterations, and combining such an architecture with at least one hierarchical loss function serves to converge more effectively to an integrated scalable model.

Figure 5:
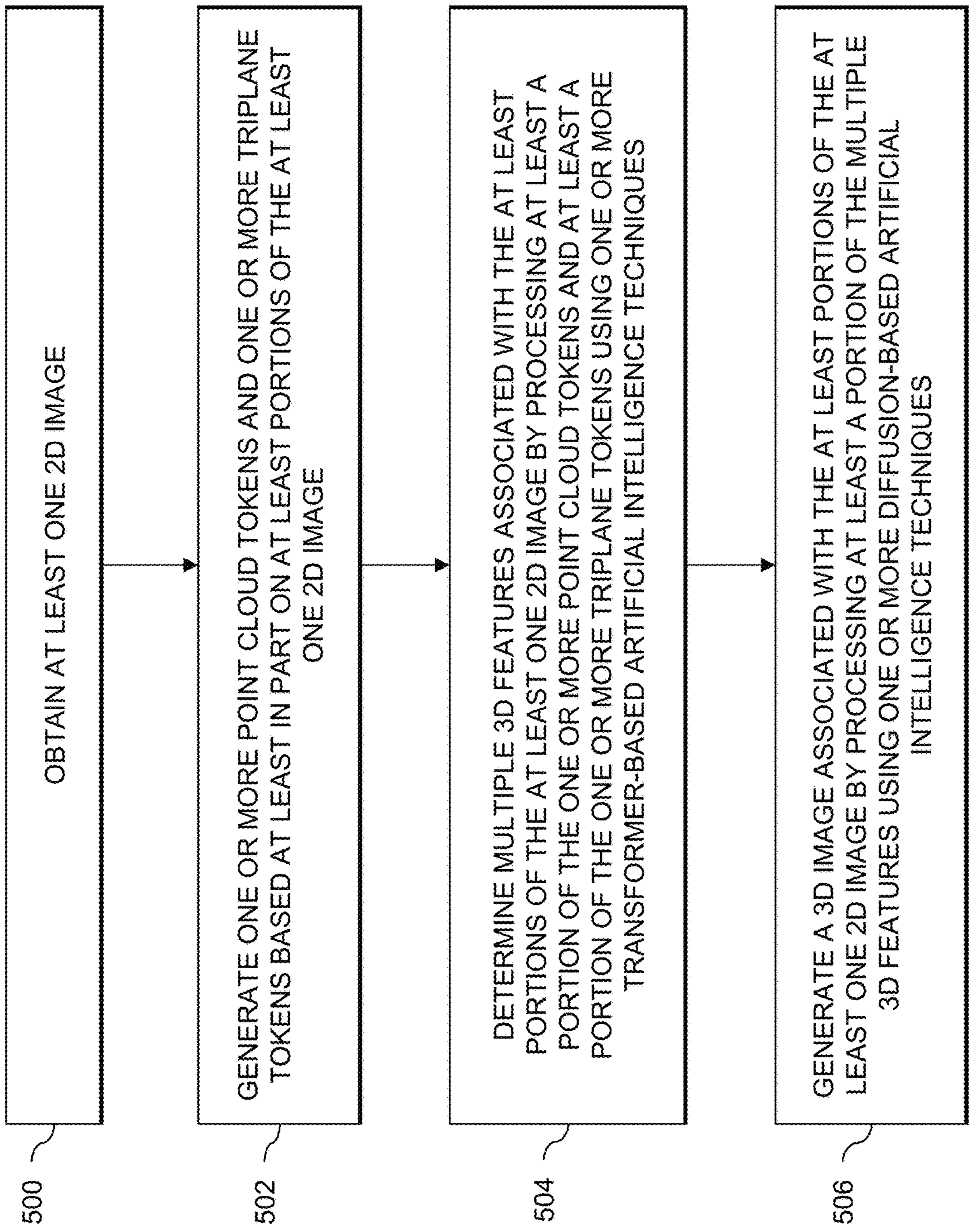
FIG. 5 is a flow diagram of a process for automatically generating 3D images using transformer-based and diffusion-based artificial intelligence techniques in an illustrative embodiment.

FIG. 5 is a flow diagram of a process for automatically generating 3D images using transformer-based and diffusion-based artificial intelligence techniques in an illustrative embodiment. It is to be understood that this particular process is only an example, and additional or alternative processes can be carried out in other embodiments.

In this embodiment, the process includes steps 500 through 506. These steps are assumed to be performed by the automated 3D image generation system 105 utilizing elements 112, 114, 116, 118 and 120.

Step 500 includes obtaining at least one 2D image. Step 502 includes generating one or more point cloud tokens and one or more triplane tokens based at least in part on at least portions of the at least one 2D image.

Step 504 includes determining multiple 3D features associated with the at least portions of the at least one 2D image by processing at least a portion of the one or more point cloud tokens and at least a portion of the one or more triplane tokens using one or more transformer-based artificial intelligence techniques. In at least one embodiment, determining multiple 3D features associated with the at least portions of the at least one 2D image includes processing at least a portion of the one or more point cloud tokens and at least a portion of the one or more triplane tokens using one or more transformer decoders. Additionally or alternatively, determining multiple 3D features associated with the at least portions of the at least one 2D image can include processing at least a portion of the one or more point cloud tokens and at least a portion of the one or more triplane tokens using one or more cross-attention techniques.

Step 506 includes generating a 3D image associated with the at least portions of the at least one 2D image by processing at least a portion of the multiple 3D features using one or more diffusion-based artificial intelligence techniques. In one or more embodiments, generating a 3D image associated with the at least portions of the at least one 2D image includes aggregating at least a portion of the multiple 3D features, using at least one MLP, to generate at least one 3D Gaussian representation associated with the at least portions of the at least one 2D image.

In at least one embodiment, the techniques depicted in FIG. 5 can also include generating, by processing at least a portion of the 3D image using a 2D diffusion model, a diffused 2D image associated with the generated 3D image and viewpoint information related to the diffused 2D image. Such an embodiment can additionally include generating one or more image feature tokens by processing the at least a portion of the diffused 2D image and the at least a portion of the viewpoint information using at least one image encoder. In such an embodiment, determining multiple 3D features associated with the at least portions of the at least one 2D image can include processing the at least a portion of the one or more point cloud tokens, the at least a portion of the one or more triplane tokens, and at least a portion of the one or more image feature tokens using the one or more transformer-based artificial intelligence techniques. Additionally or alternatively, generating one or more image feature tokens can include processing at least a portion of the diffused 2D image and at least a portion of the viewpoint information using at least one vision transformer-based model. Further, such an embodiment can also include generating an additional iteration of the 3D image by processing at least a portion of the multiple 3D features using the one or more diffusion-based artificial intelligence techniques.

In one or more embodiments, the techniques depicted in FIG. 5 can also include dynamically defining at least one diffusion area in the diffused 2D image by processing at least a portion of the diffused 2D image using one or more semantic tracing techniques. Such an embodiment also includes generating an additional iteration of the 3D image associated with the at least portions of the at least one 2D image, wherein generating the additional iteration of the 3D image comprises incorporating at least one mask to identify at least one area in the additional iteration of the 3D image which corresponds to the at least one diffusion area in the diffused 2D image.

Further, such an embodiment can additionally include generating, by processing at least a portion of the additional iteration of the 3D image corresponding to the at least one mask using the 2D diffusion model, an additional iteration of the diffused 2D image, and generating one or more additional image feature tokens by processing at least a portion of the additional iteration of the diffused 2D image using at least one image encoder. In such an embodiment, determining multiple 3D features associated with the at least portions of the at least one 2D image can include processing the at least a portion of the one or more point cloud tokens, the at least a portion of the one or more triplane tokens, and at least a portion of the one or more additional image feature tokens using the one or more transformer-based artificial intelligence techniques. Additionally, such an embodiment can include generating at least a third iteration of the 3D image by processing at least a portion of the multiple 3D features using the one or more diffusion-based artificial intelligence techniques.

Also, in at least one embodiment, the techniques depicted in FIG. 5 can include performing one or more automated actions based at least in part on the 3D image associated with the at least portions of the at least one 2D image. In such an embodiment, performing one or more automated actions includes outputting the 3D image to at least one device associated with providing the at least one 2D image. Additionally or alternatively, performing one or more automated actions can include automatically training at least a portion of one of the one or more transformer-based artificial intelligence techniques and the one or more diffusion-based artificial intelligence techniques using feedback related to the 3D image.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically generate 3D images using transformer-based and diffusion-based artificial intelligence techniques. These and other embodiments can effectively overcome problems associated with time-consuming and resource-intensive conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
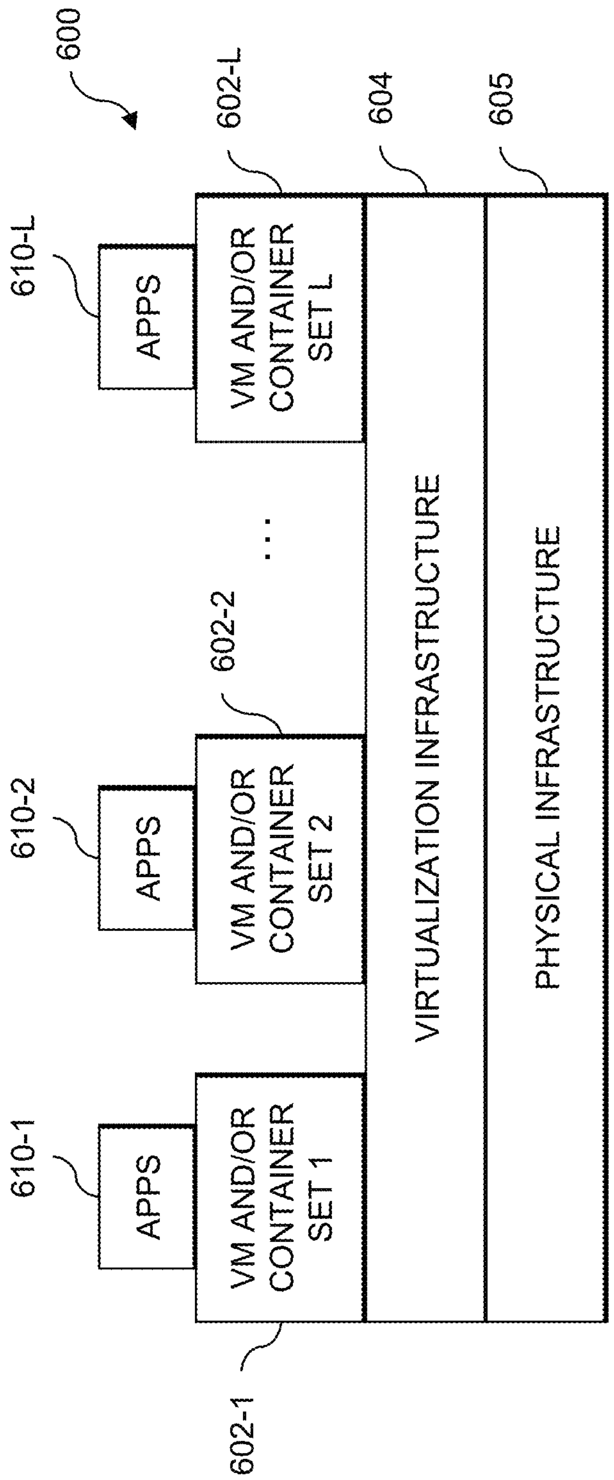
FIGS. 6 and 7 show examples of processing platforms that may be utilized to implement at least a portion of an information processing system in illustrative embodiments.
Figure 7:
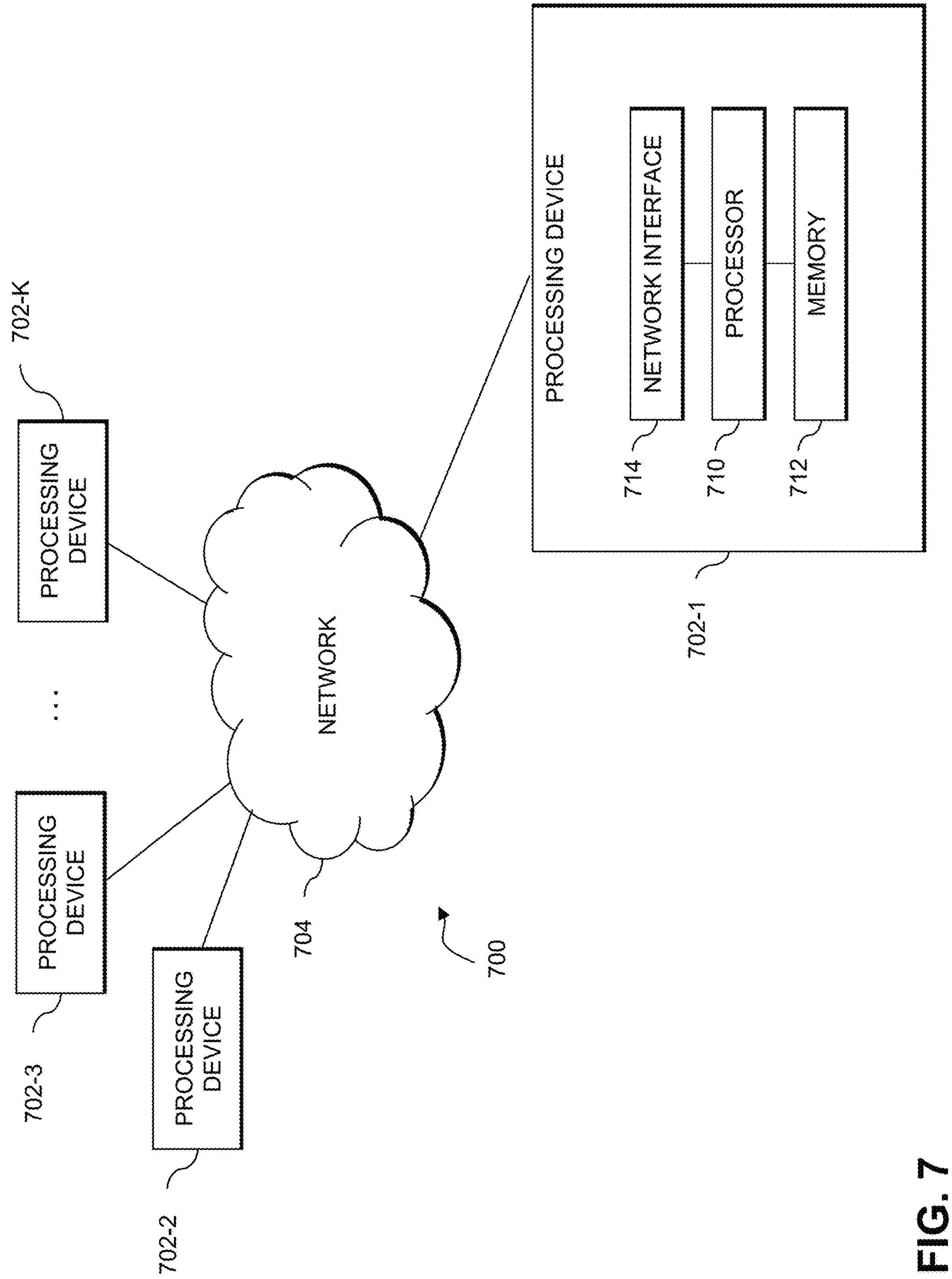

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more information processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a CPU, a GPU, a TPU, a microcontroller, an ASIC, a FPGA or other type of processing circuitry, as well as portions or combinations of such circuitry elements.

The memory 712 comprises RAM, ROM or other types of memory, in any combination.

The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used.

Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

generating one or more point cloud tokens by representing, in a three-dimensional coordinate system, one of more sets of one or more data points from at least portions of at least one two-dimensional image;

generating one or more triplane tokens by representing, on one or more axis-aligned planes, one or more data features associated with the at least portions of the at least one two-dimensional image;

determining multiple three-dimensional features associated with the at least portions of the at least one two-dimensional image by processing at least a portion of the one or more point cloud tokens and at least a portion of the one or more triplane tokens using one or more transformer-based artificial intelligence techniques to perform cross-attention and decoding processes;

generating a three-dimensional image associated with the at least portions of the at least one two-dimensional image by processing at least a portion of the multiple three-dimensional features using one or more diffusion-based artificial intelligence techniques to define a distribution of the at least a portion of the multiple three-dimensional features and generate one or more additional data points related to the at least a portion of the multiple three-dimensional features by iteratively refining one or more outputs of the one or more diffusion-based artificial intelligence techniques;

generating a diffused two-dimensional image associated with the generated three-dimensional image by processing at least a portion of the three-dimensional image using a two-dimensional diffusion model;

defining at least one diffusion area in the diffused two-dimensional image by processing at least a portion of the diffused two-dimensional image using one or more semantic tracing techniques; and generating an additional iteration of the three-dimensional image, associated with the at least portions of the at least one two-dimensional image, comprising at least one area in the additional iteration of the three-dimensional image which corresponds to the at least one diffusion area in the diffused two-dimensional image;

wherein the method is performed by at least one processing device comprising a processor coupled to a memory.

2. The computer-implemented method of claim 1, further comprising:

generating, by processing the at least a portion of the three-dimensional image using the two-dimensional diffusion model, viewpoint information related to the diffused two-dimensional image.

3. The computer-implemented method of claim 2, further comprising:

generating one or more image feature tokens by processing at least a portion of the diffused two-dimensional image and at least a portion of the viewpoint information using at least one image encoder;

wherein determining multiple three-dimensional features associated with the at least portions of the at least one two-dimensional image comprises processing the at least a portion of the one or more point cloud tokens, the at least a portion of the one or more triplane tokens, and at least a portion of the one or more image feature tokens using the one or more transformer-based artificial intelligence techniques; and generating an additional iteration of the three-dimensional image by processing at least a portion of the multiple three-dimensional features using the one or more diffusion-based artificial intelligence techniques.

4. The computer-implemented method of claim 3, wherein generating one or more image feature tokens comprises processing the at least a portion of the diffused two-dimensional image and the at least a portion of the viewpoint information using at least one vision transformer-based model.

5. The computer-implemented method of claim 1, wherein generating the additional iteration of the three-dimensional image comprises incorporating at least one mask to identify the at least one area in the additional iteration of the three-dimensional image which corresponds to the at least one diffusion area in the diffused two-dimensional image.

6. The computer-implemented method of claim 5, further comprising:

generating, by processing at least a portion of the additional iteration of the three-dimensional image corresponding to the at least one mask using the two-dimensional diffusion model, an additional iteration of the diffused two-dimensional image;

generating one or more additional image feature tokens by processing at least a portion of the additional iteration of the diffused two-dimensional image using at least one image encoder;

wherein determining multiple three-dimensional features associated with the at least portions of the at least one two-dimensional image comprises processing the at least a portion of the one or more point cloud tokens, the at least a portion of the one or more triplane tokens, and at least a portion of the one or more additional image feature tokens using the one or more transformer-based artificial intelligence techniques; and generating at least a third iteration of the three-dimensional image by processing at least a portion of the multiple three-dimensional features using the one or more diffusion-based artificial intelligence techniques.

7. The computer-implemented method of claim 1, wherein determining multiple three-dimensional features associated with the at least portions of the at least one two-dimensional image comprises processing the at least a portion of the one or more point cloud tokens and the at least a portion of the one or more triplane tokens using one or more transformer decoders.

8. The computer-implemented method of claim 1, wherein determining multiple three-dimensional features associated with the at least portions of the at least one two-dimensional image comprises processing the at least a portion of the one or more point cloud tokens and the at least a portion of the one or more triplane tokens using one or more cross-attention techniques.

9. The computer-implemented method of claim 1, wherein generating a three-dimensional image associated with the at least portions of the at least one two-dimensional image comprises aggregating at least a portion of the multiple three-dimensional features, using at least one multilayer perceptron (MLP), to generate at least one three-dimensional Gaussian representation associated with the at least portions of the at least one two-dimensional image.

10. The computer-implemented method of claim 1, further comprising:

performing one or more automated actions based at least in part on the three-dimensional image associated with the at least portions of the at least one two-dimensional image.

11. The computer-implemented method of claim 10, wherein performing one or more automated actions comprises outputting the three-dimensional image to at least one device associated with providing the at least one two-dimensional image.

12. The computer-implemented method of claim 10, wherein performing one or more automated actions comprises automatically training at least a portion of one of the one or more transformer-based artificial intelligence techniques and the one or more diffusion-based artificial intelligence techniques using feedback related to the three-dimensional image.

13. A non-transitory processor-readable storage medium having stored therein program code of one or more software programs, wherein the program code when executed by at least one processing device causes the at least one processing device:

to generate one or more point cloud tokens by representing, in a three-dimensional coordinate system, one of more sets of one or more data points from at least portions of at least one two-dimensional image;

to generate one or more triplane tokens by representing, on one or more axis-aligned planes, one or more data features associated with the at least portions of the at least one two-dimensional image;

to determine multiple three-dimensional features associated with the at least portions of the at least one two-dimensional image by processing at least a portion of the one or more point cloud tokens and at least a portion of the one or more triplane tokens using one or more transformer-based artificial intelligence techniques to perform cross-attention and decoding processes;

to generate a three-dimensional image associated with the at least portions of the at least one two-dimensional image by processing at least a portion of the multiple three-dimensional features using one or more diffusion-based artificial intelligence techniques to define a distribution of the at least a portion of the multiple three-dimensional features and generate one or more additional data points related to the at least a portion of the multiple three-dimensional features by iteratively refining one or more outputs of the one or more diffusion-based artificial intelligence techniques;

to generate a diffused two-dimensional image associated with the generated three-dimensional image by processing at least a portion of the three-dimensional image using a two-dimensional diffusion model;

to define at least one diffusion area in the diffused two-dimensional image by processing at least a portion of the diffused two-dimensional image using one or more semantic tracing techniques; and to generate an additional iteration of the three-dimensional image, associated with the at least portions of the at least one two-dimensional image, comprising at least one area in the additional iteration of the three-dimensional image which corresponds to the at least one diffusion area in the diffused two-dimensional image.

14. The non-transitory processor-readable storage medium of claim 13, wherein the program code when executed by the at least one processing device further causes the at least one processing device:

to generate, by processing the at least a portion of the three-dimensional image using the two-dimensional diffusion model, viewpoint information related to the diffused two-dimensional image.

15. The non-transitory processor-readable storage medium of claim 14, wherein the program code when executed by the at least one processing device further causes the at least one processing device:

to generate one or more image feature tokens by processing at least a portion of the diffused two-dimensional image and at least a portion of the viewpoint information using at least one image encoder;

wherein determining multiple three-dimensional features associated with the at least portions of the at least one two-dimensional image comprises processing the at least a portion of the one or more point cloud tokens, the at least a portion of the one or more triplane tokens, and at least a portion of the one or more image feature tokens using the one or more transformer-based artificial intelligence techniques; and to generate an additional iteration of the three-dimensional image by processing at least a portion of the multiple three-dimensional features using the one or more diffusion-based artificial intelligence techniques.

16. The non-transitory processor-readable storage medium of claim 13, wherein generating the additional iteration of the three-dimensional image comprises incorporating at least one mask to identify the at least one area in the additional iteration of the three-dimensional image which corresponds to the at least one diffusion area in the diffused two-dimensional image.

17. An apparatus comprising:

at least one processing device comprising a processor coupled to a memory;

the at least one processing device being configured:

to generate one or more point cloud tokens by representing, in a three-dimensional coordinate system, one of more sets of one or more data points from at least portions of the at least one two-dimensional image;

to generate one or more triplane tokens by representing, on one or more axis-aligned planes, one or more data features associated with the at least portions of the at least one two-dimensional image;

to determine multiple three-dimensional features associated with the at least portions of the at least one two-dimensional image by processing at least a portion of the one or more point cloud tokens and at least a portion of the one or more triplane tokens using one or more transformer-based artificial intelligence techniques to perform cross-attention and decoding processes;

to generate a three-dimensional image associated with the at least portions of the at least one two-dimensional image by processing at least a portion of the multiple three-dimensional features using one or more diffusion-based artificial intelligence techniques to define a distribution of the at least a portion of the multiple three-dimensional features and generate one or more additional data points related to the at least a portion of the multiple three-dimensional features by iteratively refining one or more outputs of the one or more diffusion-based artificial intelligence techniques;

to generate a diffused two-dimensional image associated with the generated three-dimensional image by processing at least a portion of the three-dimensional image using a two-dimensional diffusion model;

to define at least one diffusion area in the diffused two-dimensional image by processing at least a portion of the diffused two-dimensional image using one or more semantic tracing techniques; and to generate an additional iteration of the three-dimensional image, associated with the at least portions of the at least one two-dimensional image, comprising at least one area in the additional iteration of the three-dimensional image which corresponds to the at least one diffusion area in the diffused two-dimensional image.

18. The apparatus of claim 17, wherein the at least one processing device is further configured:

to generate, by processing the at least a portion of the three-dimensional image using the two-dimensional diffusion model, viewpoint information related to the diffused two-dimensional image.

19. The apparatus of claim 18, wherein the at least one processing device is further configured:

to generate one or more image feature tokens by processing at least a portion of the diffused two-dimensional image and at least a portion of the viewpoint information using at least one image encoder;

wherein determining multiple three-dimensional features associated with the at least portions of the at least one two-dimensional image comprises processing the at least a portion of the one or more point cloud tokens, the at least a portion of the one or more triplane tokens, and at least a portion of the one or more image feature tokens using the one or more transformer-based artificial intelligence techniques; and to generate an additional iteration of the three-dimensional image by processing at least a portion of the multiple three-dimensional features using the one or more diffusion-based artificial intelligence techniques.

20. The apparatus of claim 17, wherein generating the additional iteration of the three-dimensional image comprises incorporating at least one mask to identify the at least one area in the additional iteration of the three-dimensional image which corresponds to the at least one diffusion area in the diffused two-dimensional image.

* * * * *